(12) United States Patent
Lin

(10) Patent No.: US 10,900,518 B2
(45) Date of Patent: Jan. 26, 2021

(54) LINEAR GUIDE APPARATUS

(71) Applicant: Wei-Ting Lin, Taichung (TW)

(72) Inventor: Wei-Ting Lin, Taichung (TW)

(*) Notice: Subject to any disclaimer, the term of this patent is extended or adjusted under 35 U.S.C. 154(b) by 0 days.

(21) Appl. No.: 16/446,998

(22) Filed: Jun. 20, 2019

(65) Prior Publication Data

US 2020/0400189 A1 Dec. 24, 2020

(51) Int. Cl.
*F16C 29/06* (2006.01)
*F16C 33/10* (2006.01)

(52) U.S. Cl.
CPC .......... *F16C 29/06* (2013.01); *F16C 29/0611* (2013.01); *F16C 33/10* (2013.01)

(58) Field of Classification Search
CPC .. F16C 29/06; F16C 29/0611; F16C 29/0623; F16C 29/0657; F16C 29/0635; F16C 29/0669; F16C 29/0659; F16C 33/10; F16C 33/32; F16C 33/66; F16C 33/3806
USPC ........................................ 384/13, 43, 45, 49
See application file for complete search history.

(56) References Cited

U.S. PATENT DOCUMENTS

| | | | | |
|---|---|---|---|---|
| 7,798,718 B2* | 9/2010 | Matsumoto | ......... | F16C 29/0638 384/43 |
| 8,465,206 B2* | 6/2013 | Kondo | ................ | F16C 29/0611 384/45 |
| 8,783,951 B2* | 7/2014 | Kondo | ................ | F16C 29/0611 384/45 |
| 2006/0215943 A1* | 9/2006 | Agari | .................... | F16C 29/064 384/13 |
| 2009/0136164 A1* | 5/2009 | Pfeuffer | .................. | F16C 33/51 384/45 |
| 2015/0345561 A1* | 12/2015 | Elting | ................. | F16C 29/0645 384/15 |

FOREIGN PATENT DOCUMENTS

| | | | | | |
|---|---|---|---|---|---|
| CN | 202371017 U | * | 8/2012 | ............. | F16C 29/04 |
| CN | 203124983 U | * | 8/2013 | ............. | B23K 31/02 |
| JP | 05141418 A | * | 6/1993 | ............. | F16C 29/04 |
| WO | WO-2018105893 A1 | * | 6/2018 | ............. | F16C 33/66 |

* cited by examiner

*Primary Examiner* — Marcus Charles
(74) *Attorney, Agent, or Firm* — Che-Yang Chen; Law Office of Michael Chen

(57) ABSTRACT

A linear guide apparatus may include a guide rail, a carriage block, at least two recirculating tubes, and two end covers. The carriage block has an axial sliding channel formed at a middle portion of a bottom surface thereof, and the carriage block is slidably coupled on the guide rail through the sliding channel. Each of two sides of the sliding channel has at least a sliding groove formed between the carriage block and guide rail. Each sliding groove comprises a plurality of rolling balls installed therein so as to enable the carriage block to slide forward and backward on the guide rail. Each of the sliding grooves is cooperated with a recirculating channel axially penetrating through the carriage block. Each of the recirculating tubes comprises a plurality of spiral threads to enable the rolling balls to have lateral roll at a specific angle when passing therethrough.

5 Claims, 7 Drawing Sheets

LINEAR GUIDE APPARATUS

FIELD OF THE INVENTION

The present invention relates to a linear guide apparatus and more particularly to a long operating life and low-noise linear guide apparatus.

BACKGROUND OF THE INVENTION

The linear guide apparatus is mainly used in the occasion of liner reciprocating motion, which can achieve high-precision linear motion under high load. The function of the linear guide apparatus is to support and guide the moving part, and the moving part can have reciprocating linear displacement in a predetermined direction. Moreover, since the friction type of the linear guide apparatus is the rolling friction, the friction coefficient can be reduced to about one-fifth of the original sliding guidance, which also makes the difference between dynamic friction and static friction smaller when the linear guide apparatus is operated.

A conventional linear guide apparatus comprises a guiding rail and a sliding block, and an elongated groove is formed at a middle portion of a bottom surface of the sliding block. The sliding block is coupled on the guiding rail, and a plurality of ball channels and a plurality of recirculating channels arranged between the guiding rail and the sliding block are adapted to enable a plurality of balls to move thereon, which is configured to minimize the friction between the guiding rail and the sliding block.

However, the conventional linear guide apparatus has following disadvantages: (i) the linear guide apparatus will only push the balls forward one by one in accordance with the moving direction of the moving part, and may not enable the balls to have lateral flip during recirculating process, so that the load of the ball is adapted to be concentrated at one point of the ball, thereby reducing the operation life of the linear guide apparatus; and (ii) when the diameter of the turning section of the recirculating channel is larger than the diameter of the ball, the row of balls are adapted to have dislocation so as to make the balls having different speeds, thereby causing disturbing noise. Therefore, there remains a need for a new and improved design for a linear guide apparatus to overcome the problems presented above.

SUMMARY OF THE INVENTION

The present invent provides a linear guide apparatus which comprises a guide rail, a carriage block, at least two recirculating tubes, and two end covers. The carriage block has an axial sliding channel formed at a middle portion of a bottom surface thereof, and the carriage block is slidably coupled on the guide rail through the sliding channel. When the carriage block is coupled on the guide rail, each of two sides of the sliding channel has at least a sliding groove formed between the carriage block and the guide rail. Each of the sliding grooves comprises a plurality of slidable rolling balls installed therein so as to enable the carriage block to slide forward and backward on the guide rail. Each of recirculating channels axially penetrating through the carriage block is located adjacent to and at an outer side of the sliding groove. Each of the recirculating tubes comprises a plurality of spiral threads formed on an inner surface thereof, and the number of the spiral threads is odd which enables the rolling balls to have lateral roll at a specific angle when passing therethrough. Each of the recirculating tubes is installed in the recirculating channels. The two end covers are adapted to respectively couple with a front surface and a rear surface of the carriage block, and each of the end covers comprises a U-shaped channel embedded therein, and two ends of the U-shaped channel is formed on an inner surface of the end cover so as to enable the rolling balls to pass through therein and recirculatedly roll between the sliding groove and the recirculating tube.

Comparing with conventional linear guide apparatus, the present invention is advantageous because: (i) when rolled and moved in the recirculating tube, the rolling balls are under no loading condition and adapted to be driven by the spiral threads to have lateral roll at a specific angle, so that each time when the rolling balls are rolled and moved into the sliding groove and have loading, the rolling balls are not stressed at a particular point, thereby preventing the rolling balls from having deformation occurred at single stress point and prolonging the life time of the linear guide apparatus; (ii) the odd number of the spiral threads can prevent the rolling ball from rolled back to its initial position or to the same of specific positions after passing through the spiral threads so as to prevent the rolling ball from supporting loading at the same point; and (iii) the diameter of the U-shaped channel is larger than the recirculating tube, such that when the rolling balls are moved from the U-shaped channel into the recirculating tube, the rolling balls will move concentrically and at the same speed due to the natural spiral, thereby avoiding making disturbing noises.

DETAILED DESCRIPTION OF THE INVENTION

Figure 1:
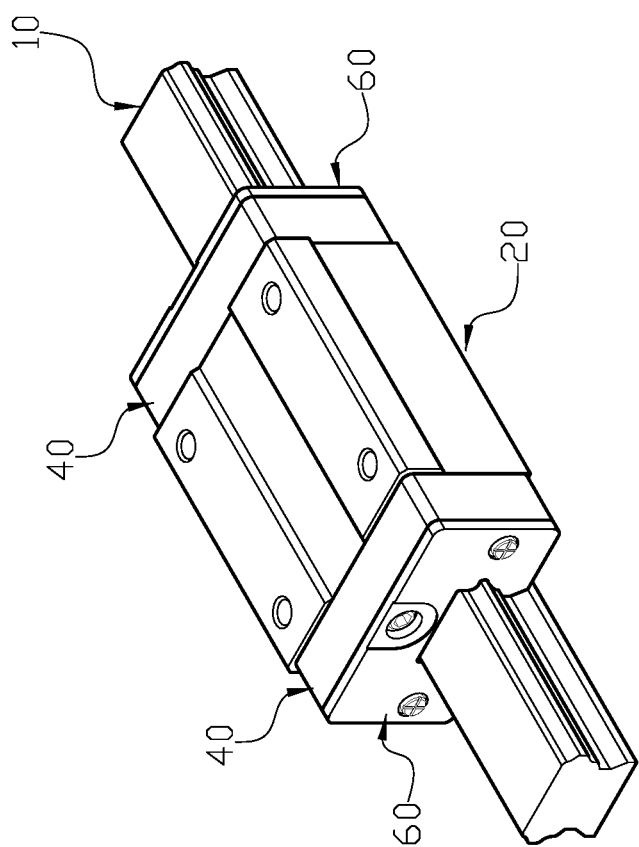
FIG. 1 is a three-dimensional assembly view of a linear guide apparatus of the present invention.
Figure 2:
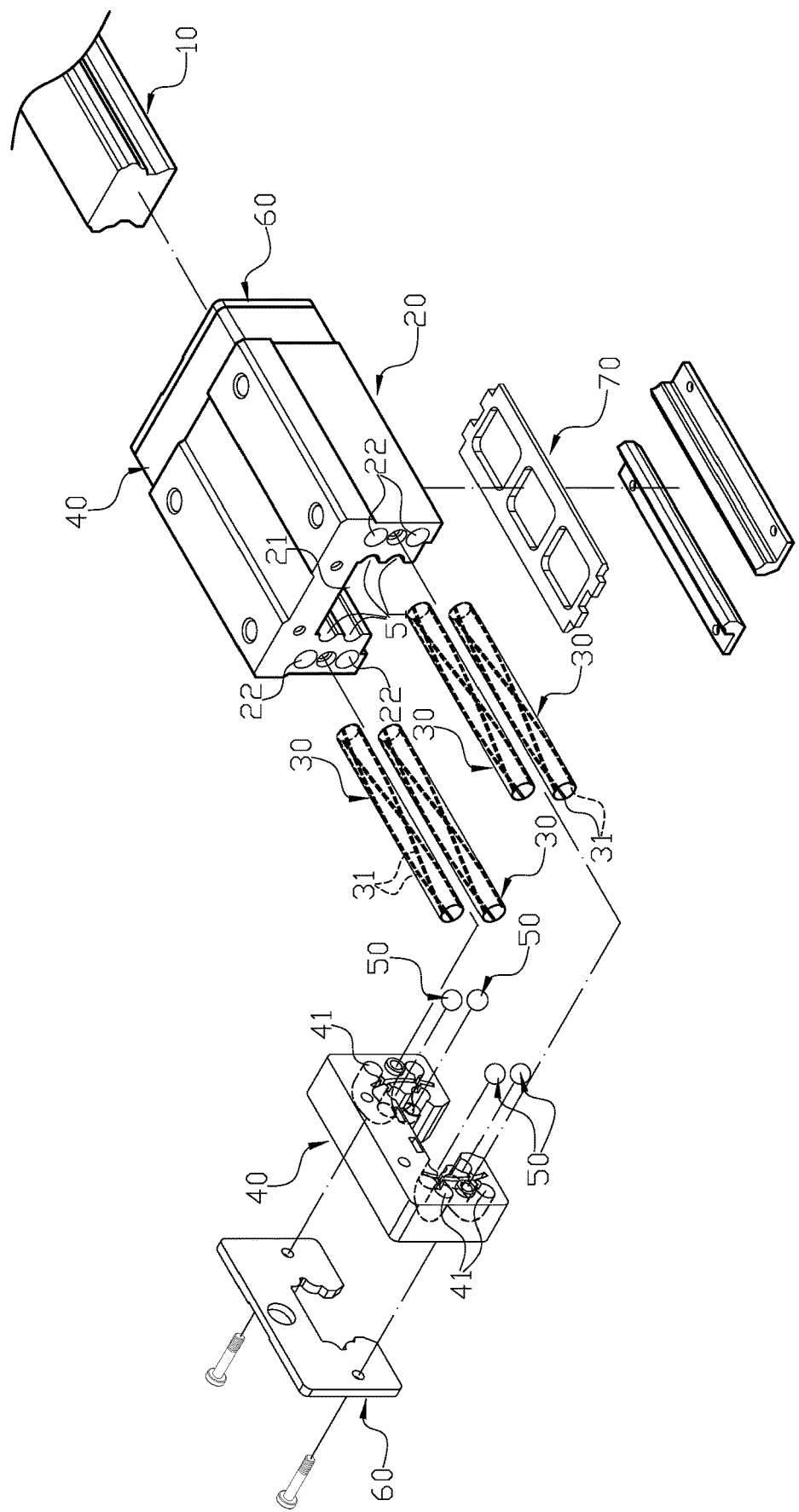
FIG. 2 is a three-dimensional exploded view of the linear guide apparatus of the present invention.
Figure 3:
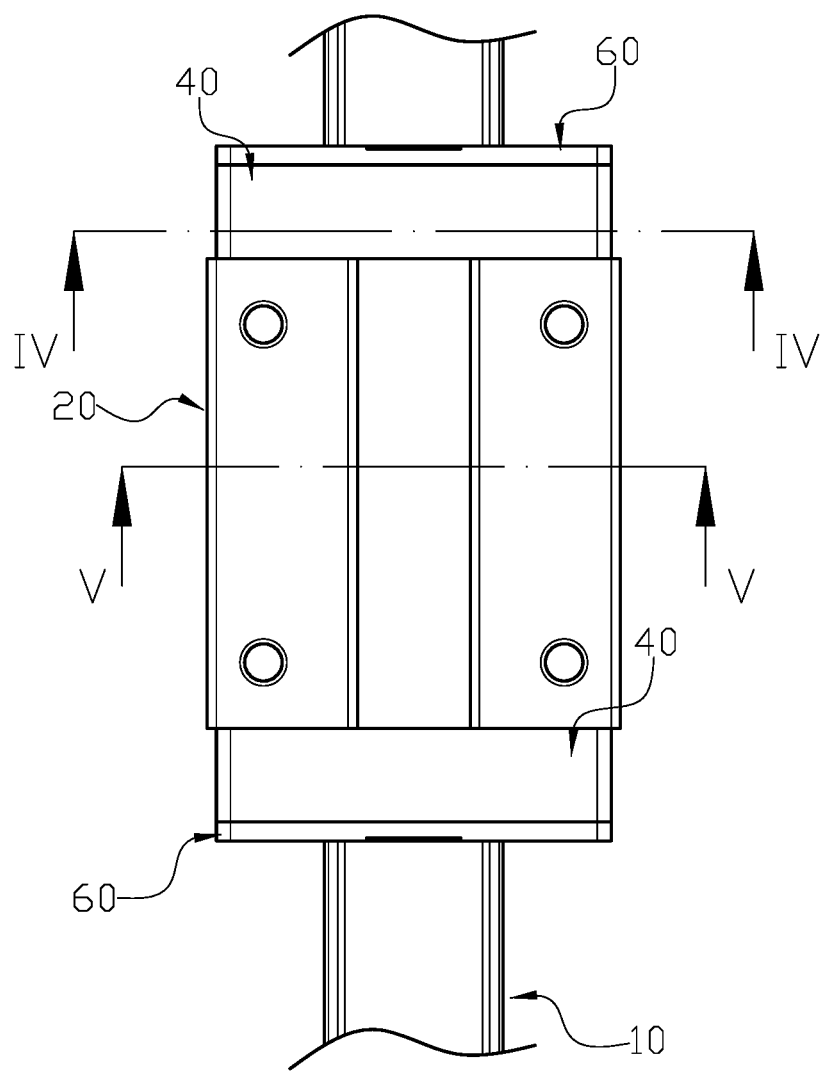
FIG. 3 is a plan assembly view of the linear guide apparatus of the present invention.
Figure 4:
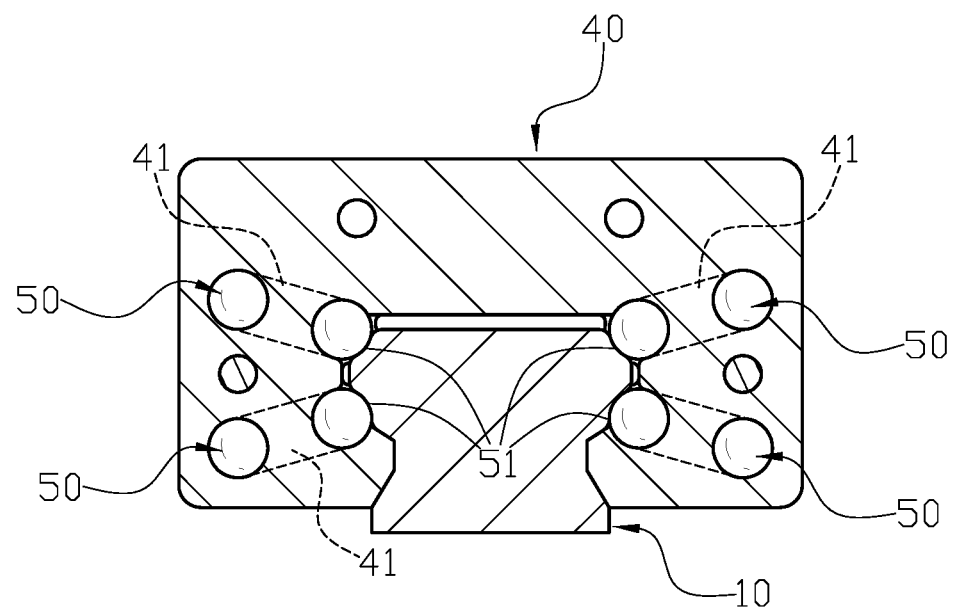
FIG. 4 is a sectional view of FIG. 3 along line IV-IV.
Figure 5:
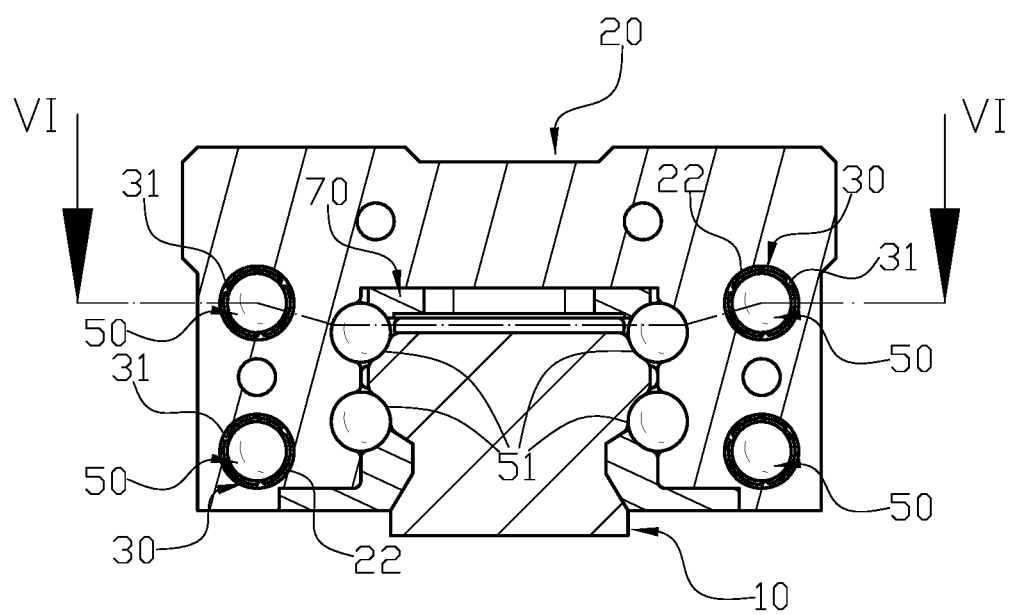
FIG. 5 is a sectional view of FIG. 3 along line V-V.
Figure 6:
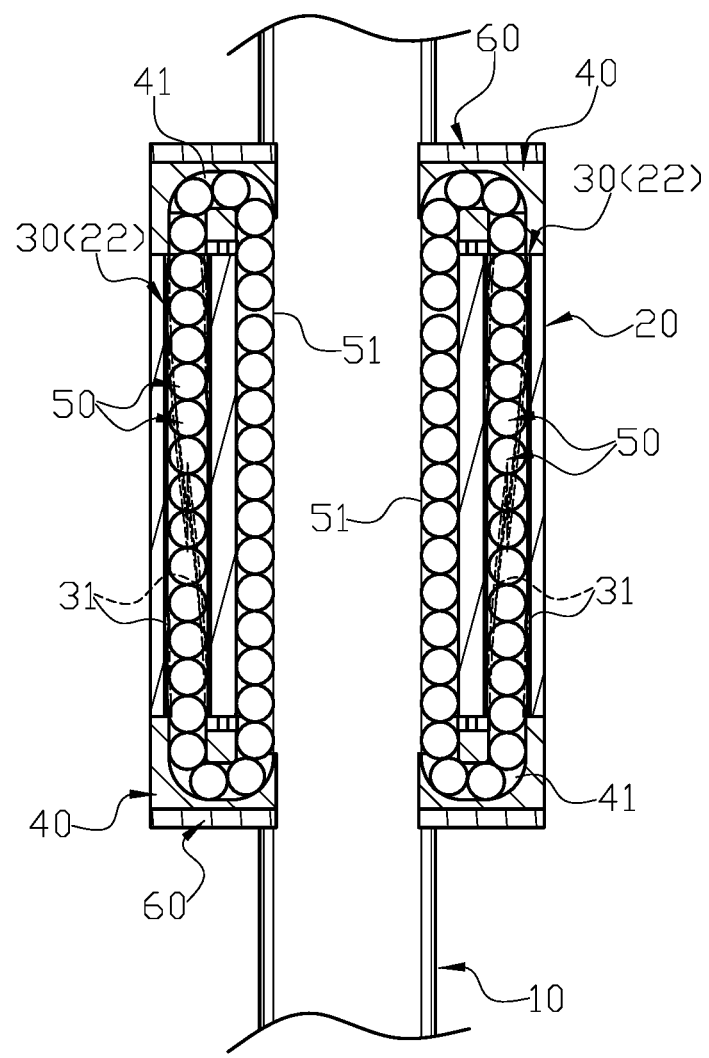
FIG. 6 is a sectional view along line VI-VI of FIG. 5.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 6, the present invention provides a linear guide apparatus which comprises a guide rail (10), a carriage block (20), at least two recirculating tubes (30), and two end covers (40). The carriage block (20) has an axial sliding channel (21) formed at a middle portion of a bottom surface thereof, and the carriage block (20) is slidably coupled on the guide rail (10) through the sliding channel (21). When the carriage block (20) is coupled on the guide rail (10), each of two sides of the sliding channel (21) has at least a sliding groove (51) formed between the carriage block (20) and the guide rail (10). Moreover, each of the sliding grooves (51) comprises a plurality of slidable rolling balls (50) installed therein so as to enable the carriage block (20) to slide forward and backward on the guide rail (10). Also, each of recirculating channels (22) axially penetrating through the carriage block (20) is formed adjacent to the sliding groove (51). More specifically, the liner guide apparatus has the number of the recirculating channels (22) same as the sliding grooves (51), and each of the recirculating channels (22) is located at an outer side of the sliding groove (51). Each of the recirculating tubes (30) comprises a plurality of spiral threads (31) formed on an inner surface thereof, and the number of the spiral threads (31) is odd which enables the rolling balls (50) to have lateral roll at a specific angle when passing therethrough. Each of the recirculating tubes (30) is installed in the recirculating channels (22). The two end covers (40) are adapted to respectively couple with a front surface and a rear surface of the carriage block (20). Furthermore, each of the end covers (40) comprises a U-shaped channel (41) embedded therein, and two ends of the U-shaped channel (41) is formed on an inner surface of the end cover (40) so as to enable the rolling balls (50) to recirculatedly roll between the sliding groove (51) and the recirculating tube (30).

In one embodiment, when the carriage block (20) is coupled on the guide rail (10), each of the two sides of the sliding channel (21) has two sliding grooves (51) formed between the carriage block (20) and the guide rail (10), and the liner guide apparatus has the number of the recirculating channels (22), the recirculating tube (30), and the U-shaped channel (41) same as the sliding grooves (51).

In another embodiment, each of the recirculating tubes (30) is a wear-resistant plastic tube.

In still another embodiment, each of the recirculating tubes (30) has three spiral threads (31) formed on the inner surface thereof (as shown in FIGS. 1 to 7).

Figure 8:
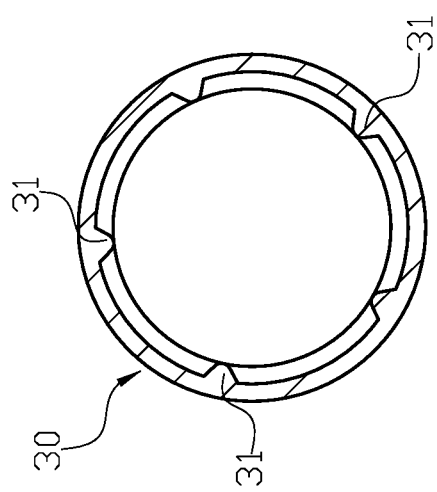
FIG. 8 is a sectional view of a second embodiment of recirculating tube of the linear guide apparatus in the present invention.
Figure 7:
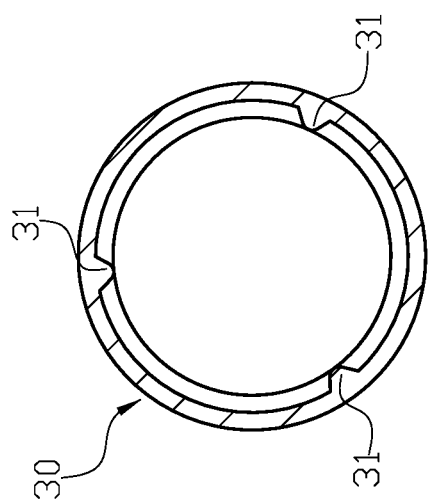
FIG. 7 is a sectional view of a first embodiment of recirculating tube of the linear guide apparatus in the present invention.

In a further embodiment, each of the recirculating tubes (30) has five spiral threads (31) formed on the inner surface thereof (as shown in FIG. 8).

Figure 9:
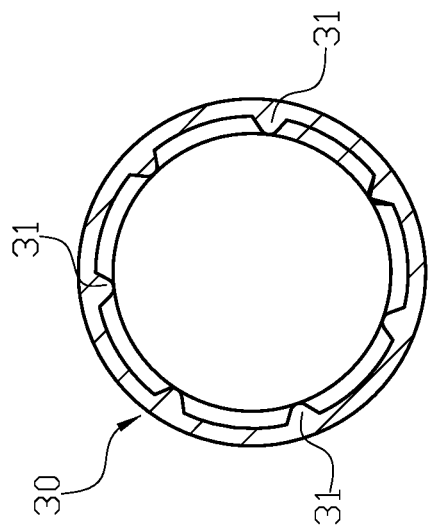
FIG. 9 is a sectional view of a third embodiment of recirculating tube of the linear guide apparatus in the present invention.

In still a further embodiment, each of the recirculating tubes (30) has seven spiral threads (31) formed on the inner surface thereof (as shown in FIG. 9).

In a particular embodiment, each of the end covers (40) is connected to a scraping plate (60) at an outer surface thereof.

In a preferred embodiment, a retainer (70) is installed between the guide rail (10) and the carriage block (20).

Figure 10:
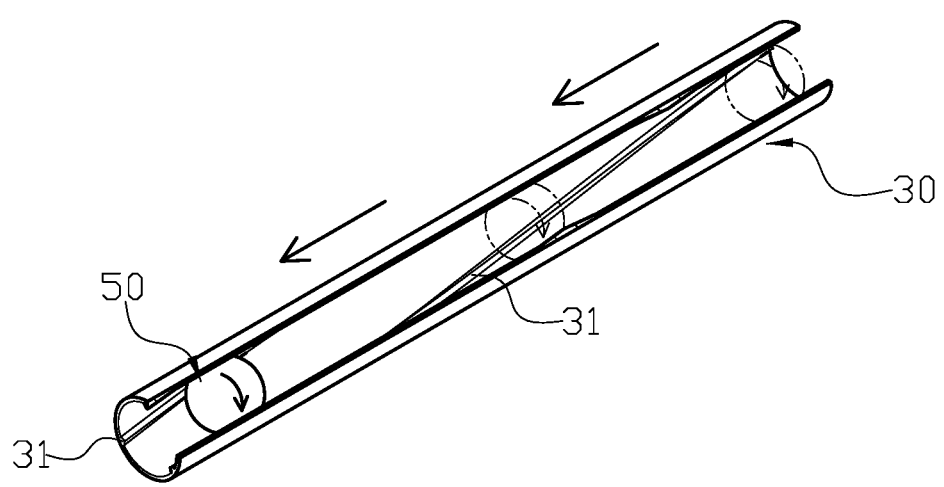
FIG. 10 is a schematic view illustrating a rolling ball (only presented by a single rolling ball) is driven by a plurality of spiral threads of the recirculating tube to have lateral roll in the recirculating tube of the linear guide apparatus in the present invention.

Comparing with conventional linear guide apparatus, the present invention is advantageous because: (i) when rolled and moved in the recirculating tube (30), the rolling balls (50) are under no loading condition and adapted to be driven by the spiral threads (31) to have lateral roll at a specific angle (as shown in FIG. 10), so that each time when the rolling balls (50) are rolled and moved into the sliding groove (51) and have loading, the rolling balls (50) are not stressed at a particular (the same) point, thereby preventing the rolling balls (50) from having deformation occurred at single stress point and prolonging the life time of the linear guide apparatus; (ii) the odd number of the spiral threads (31) can prevent the rolling ball (50) from rolled back to its initial position or the same of specific positions after passing through the spiral threads (31) so as to prevent the rolling ball (50) from supporting loading at the same point; and (iii) the diameter of the U-shaped channel (41) is larger than the recirculating tube (30), such that when the rolling balls (50) are moved from the U-shaped channel (41) into the recirculating tube (30), the rolling balls (50) will move concentrically and at the same speed due to the natural spiral, thereby avoiding making disturbing noises.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A linear guide apparatus comprising a guide rail, a carriage block, at least two recirculating tubes, and two end covers;

wherein the carriage block has an axial sliding channel formed at a middle portion of a bottom surface thereof, and the carriage block is slidably coupled on the guide rail through the sliding channel; when the carriage block is coupled on the guide rail, each of two sides of the sliding channel has at least a sliding groove formed between the carriage block and the guide rail; each of the sliding grooves comprises a plurality of slidable rolling balls installed therein so as to enable the carriage block to slide forward and backward on the guide rail; each of the sliding grooves is cooperated with a recirculating channel which axially penetrates through the carriage block and is located adjacent to and at an outer side of the sliding groove;

wherein each of the recirculating tubes comprises a plurality of spiral threads formed on an inner surface thereof, and the number of the spiral threads is odd which enables the rolling balls to have lateral roll at a specific angle when passing therethrough; each of the recirculating tubes is installed in the recirculating channels; and wherein the two end covers are adapted to respectively couple with a front surface and a rear surface of the carriage block, and each of the end covers comprises a U-shaped channel embedded therein, and two ends of the U-shaped channel is formed on an inner surface of the end cover so as to enable the rolling balls to pass through therein and recirculatedly roll between the sliding groove and the recirculating tube.

2. The linear guide apparatus of claim 1, wherein when the carriage block is coupled on the guide rail, each of the two sides of the sliding channel has two sliding grooves formed between the carriage block and the guide rail, and each of the sliding grooves is cooperated with one recirculating channel, one recirculating tube, and one U-shaped channel.

3. The linear guide apparatus of claim 1, wherein each of the recirculating tubes is a wear-resistant plastic tube.

4. The linear guide apparatus of claim 1, wherein each of the end covers is connected to a scraping plate at an outer surface thereof.

5. The linear guide apparatus of claim 1, wherein a retainer is installed between the guide rail and the carriage block.

* * * * *